W. ROBERTS.
TRAVELING ROCKING HORSE.
APPLICATION FILED NOV. 26, 1910.
1,010,178.
Patented Nov. 28, 1911
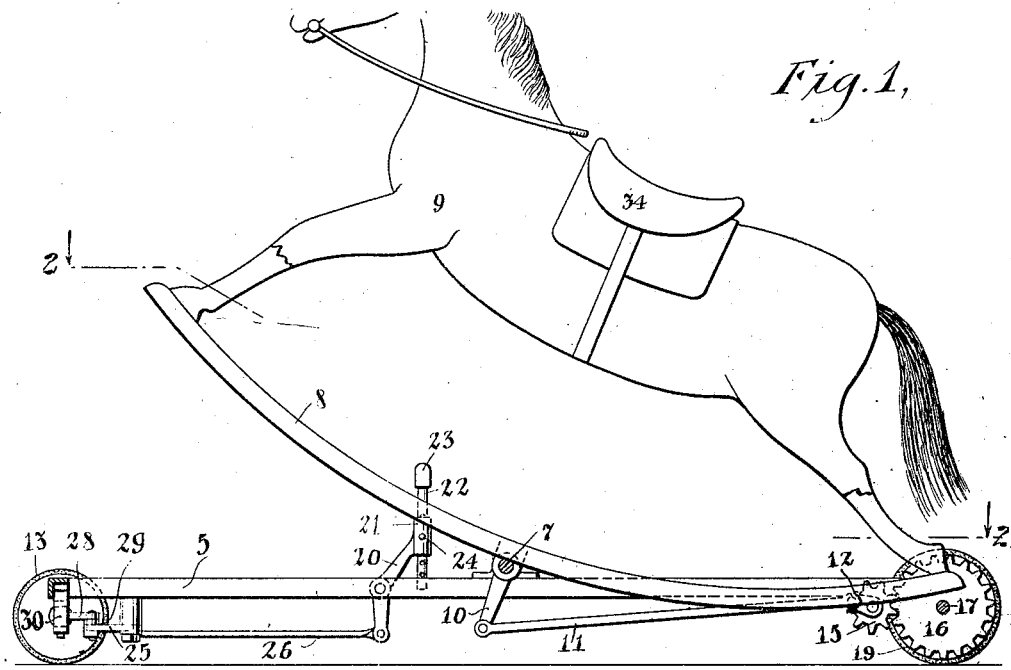
Fig. 1.
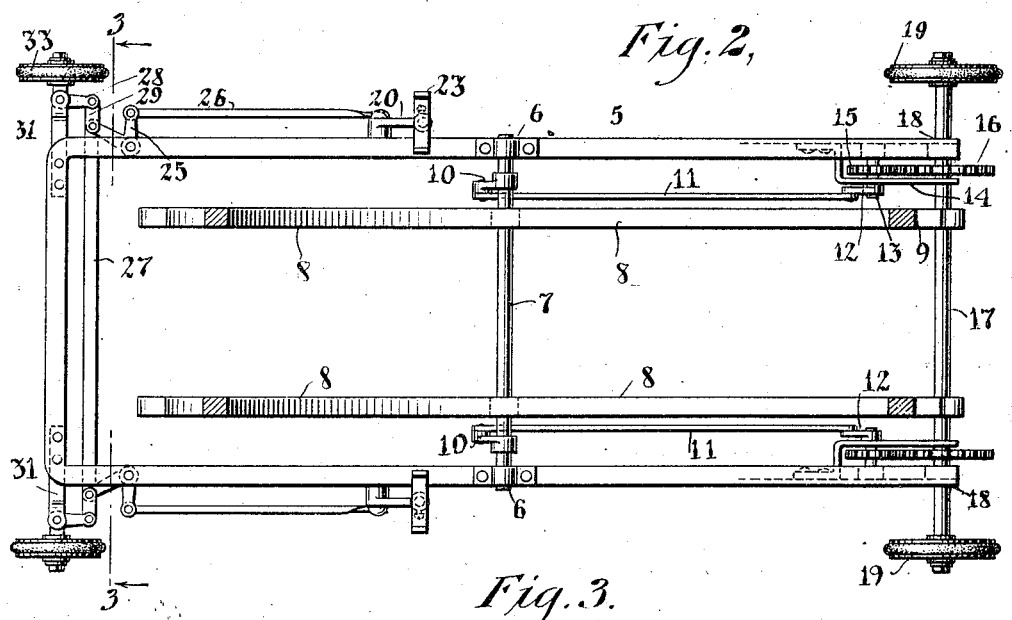
Fig. 2.
Fig. 3.
WITNESSES
E. Thorpe
E. B. Marshall
INVENTOR
William Roberts
BY
ATTORNEYS

UNITED STATES PATENT OFFICE.

WILLIAM ROBERTS, OF SPRINGFIELD, OHIO.

TRAVELING ROCKING-HORSE.

1,010,178.   Specification of Letters Patent.   Patented Nov. 28, 1911.

Application filed November 26, 1910. Serial No. 594,286.

*To all whom it may concern:*

Be it known that I, WILLIAM ROBERTS, a citizen of the United States, and a resident of Springfield, in the county of Clark and State of Ohio, have invented a new and useful Traveling Rocking-Horse, of which the following is a full, clear, and exact description.

My invention relates to traveling rocking horses and it has for its object to provide one which is propelled by means connected to a rock shaft to which the horse is secured, stirrups being provided which are connected with steering mechanism by which the direction of travel may be controlled.

Additional objects of the invention are disclosed in the following complete specification, in which the preferred form of my invention is disclosed.
In the drawings similar characters of reference indicate corresponding parts in all the views, in which—

Figure 1 is a sectional side elevation of my invention; Fig. 2 is a sectional view on the line 2—2 of Fig. 1; and Fig. 3 is a sectional view on the line 3—3 of Fig. 2.

By referring to the drawings it will be seen that a rectangular frame 5 is provided, having bearings 6, in which a rock shaft 7 is journaled, rocker members 8 being secured to the rock shaft 7, the rocker members 8 having secured to them the horse 9. Arms 10 are rigidly secured to the rock shaft 7, links 11 being articulated to these arms 10, the said links 11 being also articulated to cranks 12, which are secured to shafts 13, journaled in bearings in the frame 5, and in the supports 14. Gear wheels 15 are secured to these shafts 13, the gear wheels 15 meshing with gear wheels 16, secured to the rear axle 17, journaled in bearings 18 in the frame 5. Two wheels 19 are mounted on the axle 17, one of the wheels 19 being secured to the said axle.
To the outer sides of the frame 5 are articulated levers 20, the upper terminals of these levers 20 having sleeves 21, in which are disposed shanks 22, connected with the stirrups 23. The shanks 22 are held in position in the sleeves 21 by means of set screws 24, it being understood that the stirrups 23 may be adjusted at any desired height relatively to the levers 20. Bell crank levers 25 are pivoted to the frame 5, these bell crank levers 25 being connected with the lower arms of the levers 20 by means of links 26. The bell crank levers 25 are connected by a rod 27, and they are also connected with arms 28 by links 29, these arms 28 being rigidly secured to the knuckles 30, pivoted to the members 31, projecting laterally from the frame 5. These knuckles 30 have axles 32, on which are mounted wheels 33. When a child is seated in the saddle 34, on the horse 9, with his feet resting in the stirrups 23, he may rock the horse with the shaft 7, thereby rotating the cranks 12, by means of the arms 10, and the links 11, the cranks 12 carrying with them the gear wheels 15, which mesh with the gear wheels 16, thereby rotating the rear axle 17, and one of the wheels 19. In this way the device is propelled. The device is steered by the child on the horse by means of the stirrups 23, for by pushing on the right stirrup the child may direct the forward wheels 33 to the left, or when desired, the child may press on the left stirrup, thereby directing the forward wheels to the right. It will also be understood that the stirrups may be used to assist the child in rocking the horse, thereby driving the propelling mechanism.

As the shanks 22 of the stirrups 23 are adjustably secured to the levers 20, the height of the stirrups may be adjusted, so that the child seated on the saddle 34 may obtain the desired purchase.

Having thus described my invention, I claim as new and desire to secure by Letters Patent, the following:

1. In a traveling rocking horse a frame having a bearing, a rock shaft journaled in the bearing, an animal member mounted on the rock shaft, wheels for supporting the frame, an arm secured to the rock shaft, a crank journaled in the frame, a link connecting the rock shaft and the crank, means by which the crank is adapted to drive one of the said wheels, knuckles having axles pivoted to the frame, wheels on the axles, levers pivoted to the frame, stirrups mounted on the levers respectively, additional levers pivoted to the frame, links connecting the first and second-mentioned levers, arms on the knuckles, and additional links connecting the arms with the second-mentioned levers.

2. In a traveling rocking horse a frame having a bearing, a rock shaft journaled in the bearing, wheels for supporting the frame, an animal figure secured to and adapted to operate the rock shaft, an arm secured to the rock shaft, a crank journaled in the frame, a link connecting the arm with the crank, means by which the crank is adapted to rotate one of the wheels, stirrups adapted to be used by the operator seated on the animal figure to obtain a purchase, and means by which the stirrups are supported on the frame.

In testimony whereof I have signed my name to this specification in the presence of the two subscribing witnesses.

WILLIAM ROBERTS.

Witnesses:
C. A. WADSWORTH,
HOWARD E. MACGREGOR.